United States Patent [19]

Briggs et al.

[11] Patent Number: 5,446,800
[45] Date of Patent: Aug. 29, 1995

[54] METHOD AND APPARATUS FOR DISPLAYING ANGIOGRAPHIC DATA IN A TOPOGRAPHIC FORMAT

[75] Inventors: Sandra A. Briggs, Hayward; Ray S. Spratt, San Jose; Steven F. Forestieri, Santa Clara, all of Calif.

[73] Assignee: Diasonics Ultrasound, Inc., Milpitas, Calif.

[21] Appl. No.: 259,198

[22] Filed: Jun. 13, 1994

[51] Int. Cl.⁶ .............................. G06K 9/00
[52] U.S. Cl. .................. 382/128; 128/661.08; 128/662.02; 382/162
[58] Field of Search ............ 382/1, 6; 128/661.08, 128/660.05, 662.02, 916; 348/163; 364/413.25

[56] References Cited

U.S. PATENT DOCUMENTS

| | | | |
|---|---|---|---|
| 5,148,809 | 9/1992 | Biegeleisen-Knight et al. | 128/660.07 |
| 5,241,473 | 8/1993 | Ishihara et al. | 364/413.25 |
| 5,349,524 | 9/1994 | Daft et al. | 364/413.25 |
| 5,349,525 | 9/1994 | Dunki-Jacobs et al. | 364/413.25 |
| 5,363,850 | 11/1994 | Soni et al. | 128/661.08 |

Primary Examiner—Leo H. Boudreau
Assistant Examiner—Andrew W. Johns
Attorney, Agent, or Firm—Blakely, Sokoloff, Taylor & Zafman

[57] ABSTRACT

A method and apparatus for displaying an image representing the flow of a substance in a scanned area. An Angio scanner scans a region of tissue and generates Ultrasound Angio data representing the flow of blood in the region of tissue. Relatively small blood flows are difficult to detect in images based solely on Angio data. To enhance the visibility of small blood flows, spatial derivative values are calculated from the Angio data. A fraction of the original Angio data plus a bias is summed with the spatial derivative values to generate composite values. An image of the scanned region is displayed with colors or grayscale shades based on the composite values. The resulting image depicts blood vessels in an edge-enhanced format, giving a three-dimensional appearance.

18 Claims, 5 Drawing Sheets

METHOD AND APPARATUS FOR DISPLAYING ANGIOGRAPHIC DATA IN A TOPOGRAPHIC FORMAT

FIELD OF THE INVENTION

This invention relates to a method and apparatus for displaying angiographic data in a topographic format, and more specifically to a method and apparatus for displaying an image based on Ultrasound Angio data which enhances the visibility of blood vessel boundaries.

BACKGROUND OF THE INVENTION

Figure 3A:
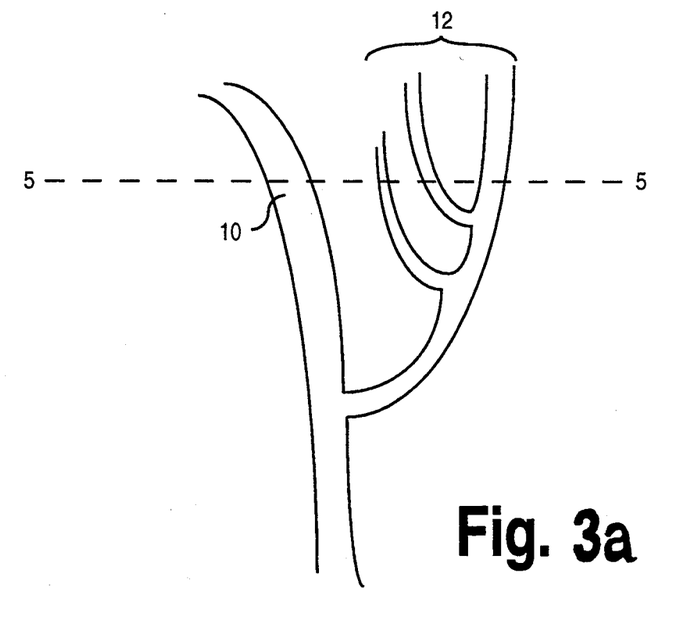
FIG. 3a illustrates blood vessels in an exemplary scanned area.
Figure 3B:
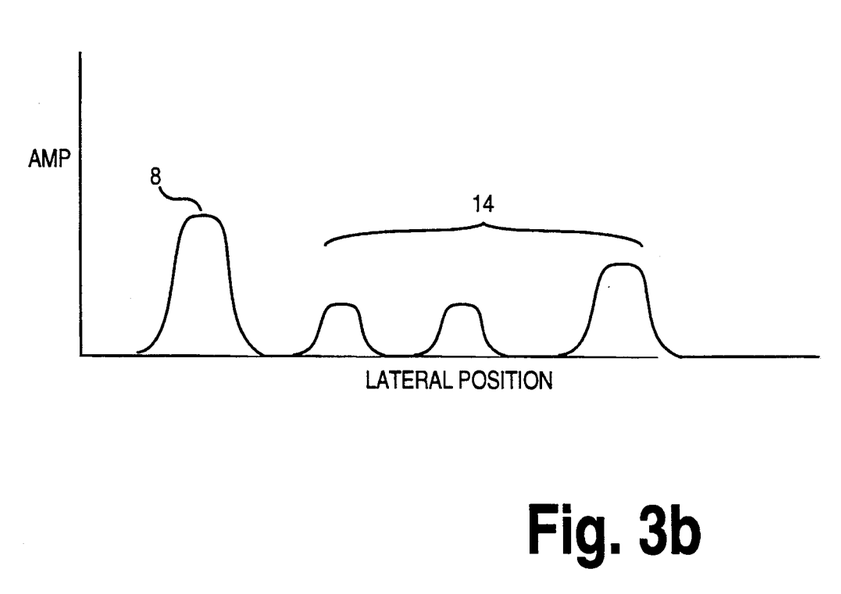

Ultrasound Angio data represents the amount of blood flowing in a scanned region of interest ("ROI"). The greater the number of reflectors in a particular section of the ROI, the larger the amplitude of the Doppler signal received from the particular section. For example, FIG. 3a illustrates the blood vessels near the edge of a kidney. The Ultrasound Angio signal generated by scanning the blood vessels across line 5—5 is illustrated in FIG. 3b, where the horizontal axis represents lateral position and the vertical axis represents the amplitude of the Angio data. As expected, the amplitude of the Angio region 8 for a larger vessel 10 is relatively large, and the Angio region 14 for smaller vessels 12 is relatively small.

In the past, blood flow displays have been produced by mapping the Angio data to a color hue. For example, in a typical image, sections with higher Angio values may be displayed with brighter colors and sections with lower Angio values may be displayed with dimmer colors.

One problem with displaying and interpreting Ultrasound Angio data in this manner is that small vessels are difficult to detect. The large vessels with high amplitude signals dominate the display, while the small vessels with lower amplitudes can fade into the background. Specifically, the large, high amplitude vessels will be displayed in the brightest colors and will therefore be easiest to see, while the smallest vessels will be dim and difficult to detect.

In light of the foregoing, it is clearly desirable to provide an apparatus and method for displaying blood flow which increases the visibility of smaller vessels. Further, it is clearly desirable to provide an apparatus and method for increasing the visibility of edges in an image illustrating blood flow.

SUMMARY AND OBJECTS OF THE INVENTION

According to one aspect of the invention, an apparatus for generating an image that represents a flow of a substance in a scanned area is provided. The scanned area may be, for example, an Ultrasound Angio region of interest. The image has a plurality of image subregions. The apparatus includes a scanner, a processing circuit and a display unit.

The scanner scans the region of interest to produce a plurality of scanned values. The scanner may be, for example, an ultrasound Angio scanner and the plurality of scanned values may be ultrasound Angio data. The scanned value for each scanned section has an amplitude which represents the flow of the substance in the scanned section.

The processing circuit may be, for example, a digital processor or an analog circuit. The processing circuit receives the plurality of scanned values from the scanner. The processing circuit determines a color index for each image subregion and develops a second set of indices based on spatial derivatives derived from the first set of indices. The display unit receives these new indices and displays an RGB color value corresponding to each index. The image displayed by the apparatus displays blood vessels as edge-enhanced regions lending the appearance of three dimensions.

According to another aspect of the invention, a method for determining color hues for a plurality of image subregions in an image is provided. The scanned area may be, for example, an Ultrasound Angio region of interest and the substance may be blood. The image is an image of a scanned area which has a plurality of scanned sections.

According to the method, a correlation is established between a plurality of color values and a range of composite values. This may be performed, for example, by mapping gray scale shades to the range of composite values.

For each given image subregion, a selected set of scanned sections, including a first scanned section, is selected. This may be performed, for example, by selecting the first scanned section and one or more scanned sections laterally aligned with the first scanned section.

Angio values that represent the flow of blood in the selected set of scanned sections is received. The Angio values include a first value that represents the flow of the substance in the first scanned section.

A derivative value is generated based on the Angio values. The derivative value is a spatial derivative of the Angio values. A composite value is generated based on the derivative value. This may be performed, for example, by adding a fraction of the first value to the derivative value. More specifically, this may be performed, by multiplying the first value by a first coefficient to generate a first product, multiplying the derivative value by a second coefficient to generate a second product, and adding the first product and the second product to a predetermined constant. In addition, a bias value is added to the aforementioned sum. A color value for each region is selected based on the composite value according to the established RGB lookup table.

According to one aspect of the invention, the image appears to display three dimensional ridges illuminated by a light source. Optionally, the method includes a step in which a user selects an orientation of the light source.

BRIEF DESCRIPTION OF THE DRAWINGS

The invention may best be understood by referring to the following description and accompanying drawings which illustrate the invention. In the drawings:

FIG. 3b is a graph illustrating the amplitude of Angio values produced by scanning the blood vessels of FIG. 3a;

DETAILED DESCRIPTION

Figure 1:
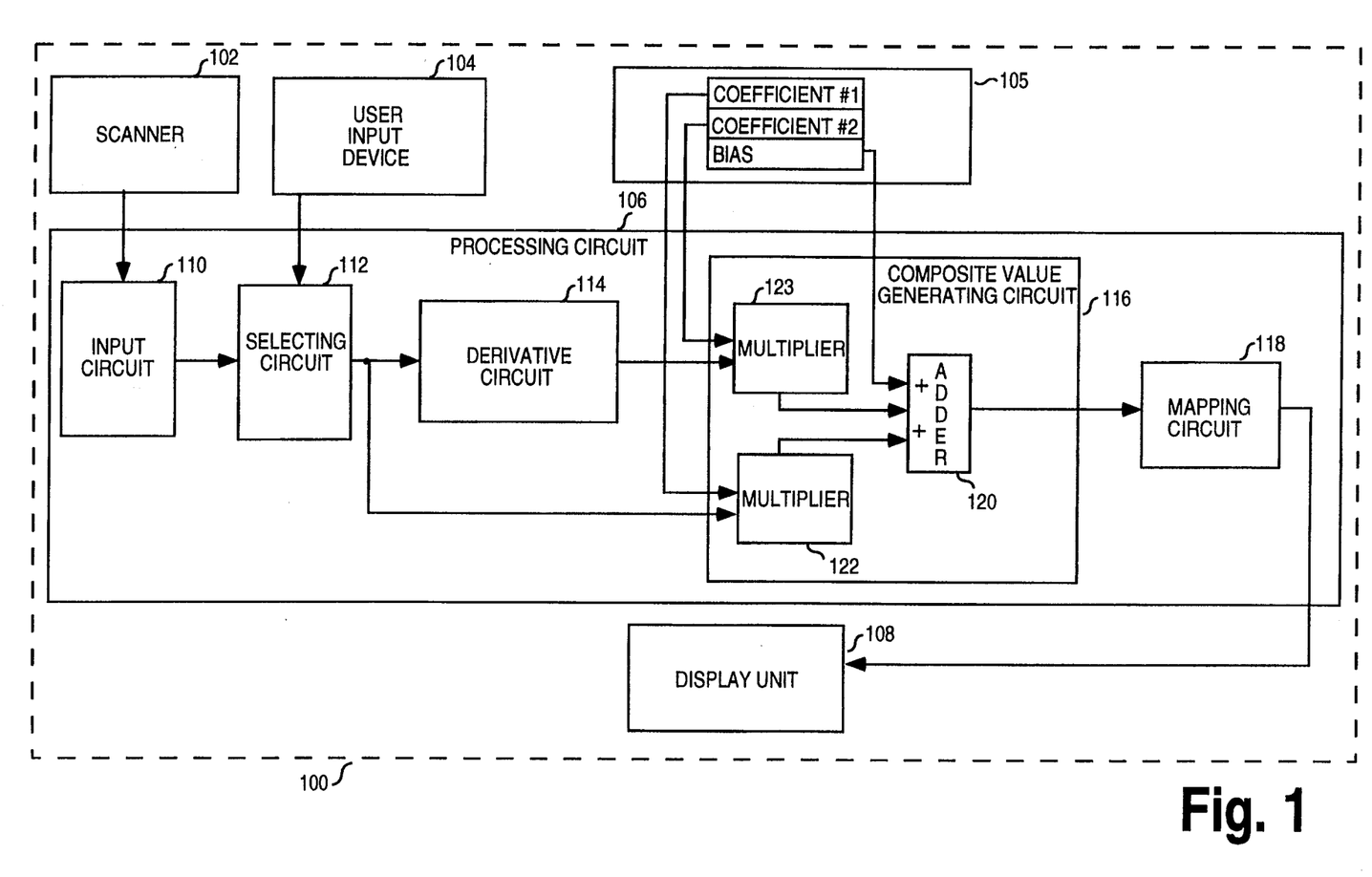
FIG. 1 is a block diagram of a device for displaying images representing the flow of blood in an Ultrasound Angio region of interest according to one embodiment of the invention.

FIG. 1 illustrates a functional block diagram of an imaging device 100 for displaying ultrasound Angio images according to one embodiment of the present invention. As explained above, Angio images represent the flow of blood in a scanned region of interest. However, while embodiments of the present invention shall be described with respect to blood flow in a scanned region of interest, imaging device 100 is not limited to any specific type of flow measurements. Thus, imaging device 100 may alternatively display images of the flow of any substance in any type scanned area.

Imaging device 100 generally includes a scanner 102, a user input device 104, a storage device 105, a processing circuit 106, and a display unit 108. Scanner 102 is preferably an ultrasound Angio scanner. Scanner 102 scans a region of the body and produces signals representative of the amount of blood flow in the region of interest.

The processing circuit 106 is connected to the scanner 102. The processing circuit 106 may be, for example, a general purpose digital processor, a digital signal processor, or an analog circuit. The processing circuit 106 receives the signals from the scanner 102 and generates a plurality of color values based on the signals. As shall now be explained, processing circuit 106 is configured to generate color values in which values representing smaller vessels have approximately the same amplitude as those representing larger vessels.

As mentioned above, when Angio data is mapped directly to a color value to produce an image, the vessels represented by smaller amplitude data are difficult to discern. Processing circuit 106 overcomes this obstacle by processing the raw Angio data to produce color values in which smaller vessels and larger vessels are represented by values of similar amplitude. Specifically, processing circuit 106 equalizes the amplitude of the larger and smaller vessels by taking the spatial derivative of the Angio data.

For example, assume that the Angio amplitude from a vessel is roughly proportional to the vessel's width. If the functional form of the response of one vessel is f(x), then a vessel that is larger by a factor "a" would have a spatial Angio response of a[f(x/a)]. The derivative of the smaller vessel would be f(x), while the derivative of the larger vessel is f(x/a). Consequently, the derivative of the larger vessel is still longer spatially than the small vessel, but they both have the same magnitude.

Figure 3C:
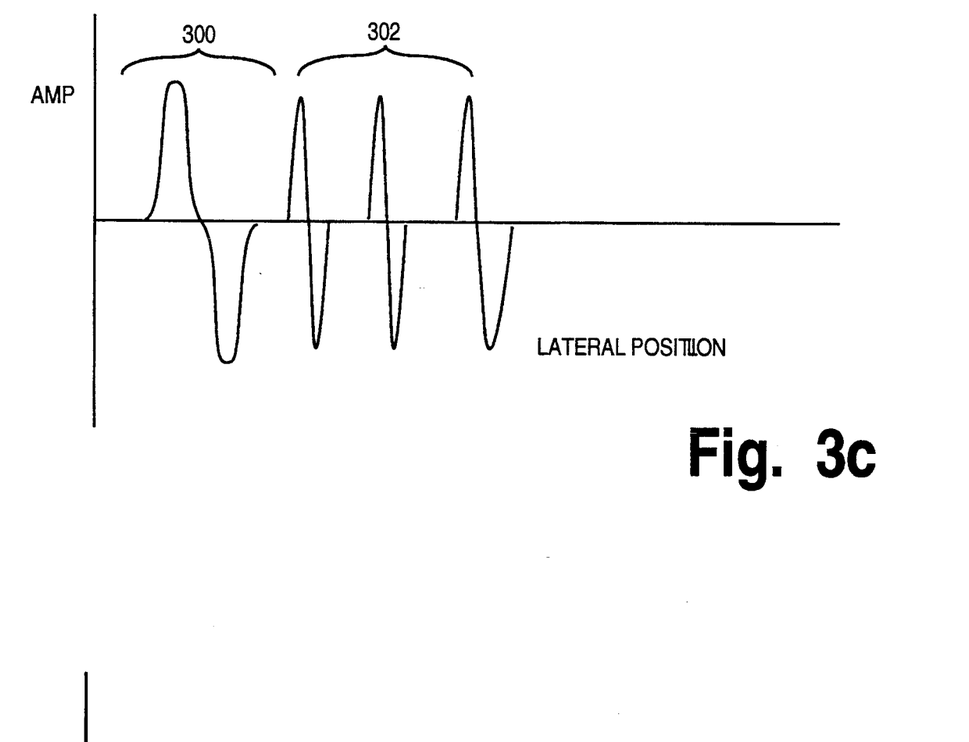
FIG. 3c is a graph illustrating the amplitude of derivative values generated based on the Angio values of FIG. 3b.

The spatial derivative of the Angio signal illustrated in FIG. 3b is shown in FIG. 3c. Specifically, the spatial derivative of Angio region 8 results in curve 300, and the spatial derivative of Angio regions 14 results in curves 302. As is evident, the geometric sizes of the Angio regions are preserved in the derivative operation, but the amplitudes of the data corresponding to the larger and smaller vessels have been equalized.

According to one embodiment, a blood flow image is produced by mapping the spatial derivative values to colors or shades of gray. In such an image, the visibility of the smaller vessels is significantly enhanced. However, one problem with an image colored solely based on the spatial derivative values is that zero is no longer the minimum possible amplitude value. Therefore, a bias is preferably added to the derivative values before a color or grayscale value is assigned.

Figure 3D:
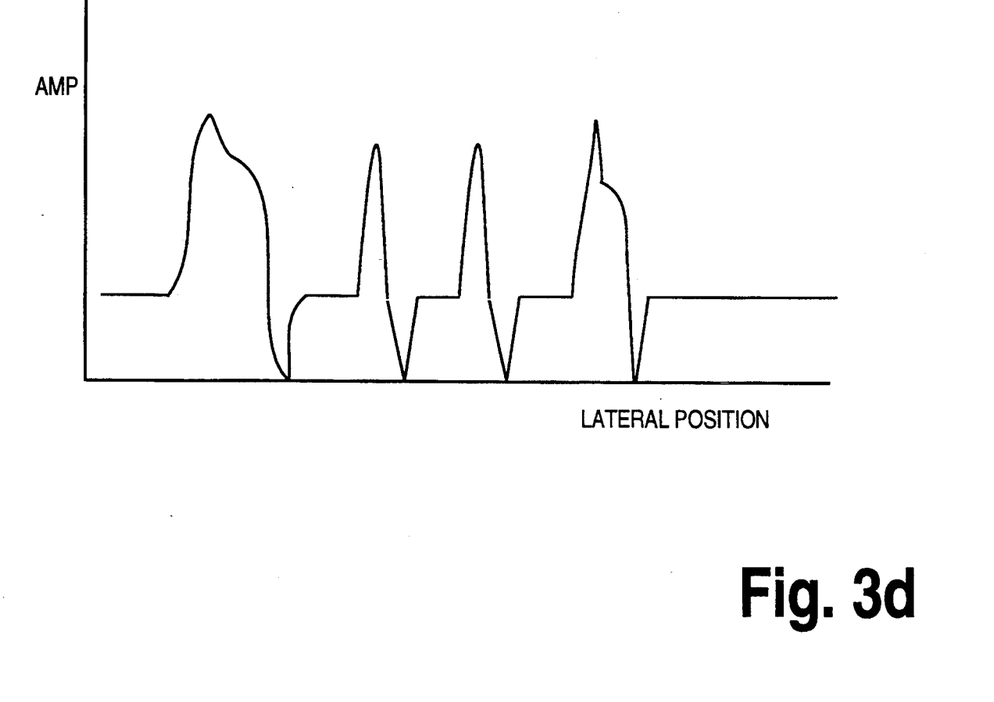
FIG. 3d is a graph illustrating the amplitude of composite values generated based on the Angio values of FIG. 3b and the derivative values of FIG. 3c.

Another disadvantage of using only the derivative values to generate an image is that the derivative values corresponding to vessels which flow perpendicular to the direction of the spatial derivative are much greater than the derivative values corresponding to vessels with the same flow that are not perpendicular to the direction of the spatial derivative. For example, a large vessel with a high but constant flow that runs parallel to the direction of the spatial derivative may have no corresponding derivative curve at all. Therefore, the vessel may not appear in an image based solely on the derivative values. Preferably, evidence of such parallel vessels is retained by adding back to the derivative values a fraction of the original Angio values. FIG. 3d illustrates a graph of the curves created by adding a bias value and a fraction of the Angio regions of FIG. 3b to the derivative curves of FIG. 3c.

The processing required to transform the derivative data to produce the values shown in FIG. 3d may be implemented using a constant plus a two tap FIR filter. The exact values of the parameters are preferably based on the range and spacing of the original Angio data. For example, assume that the amplitudes of the original Angio data range from 0 to 255 and that the resolution of the scan is such that the largest change from one Angio value to its nearest neighbor is usually less than 1/6 of this range. Under these conditions, a composite value for each scanned section may be generated by summing a bias constant of 128 with three times the derivative value corresponding to the section and half of the original Angio value corresponding to the section. The resulting composite values will generally fall within the original range of 0 to 255. The mechanism used by processing circuit 106 to generate the plurality of color values based on the plurality of composite values shall be described in greater detail below.

The display unit 108 is operatively coupled to the processing circuit 106. The display unit 108 generally represents one or more devices capable of displaying an image with a varying color characteristic. The color characteristic which varies is preferably brightness. Therefore, the display unit need not be capable of rendering color images. Display unit 108 may therefore include a grayscale or color printer, or a grayscale or color video display device. The display unit 108 receives the color values from the processing circuit 106 and generates an image of the scanned area which is colored based on the color values.

It has been discovered that images representing three-dimensional topographic maps are produced when brighter colors are assigned to image subregions corresponding to higher color values and darker colors are assigned to image subregions corresponding to lower color values. Specifically, blood flows faster in the center of a blood vessel. Therefore, the Angio values representing a blood vessel will increase as the scan approaches the center of the vessel and decrease as the scan moves away from the center of the vessel. Consequently, the derivative values will be positive on one side of a blood vessel, zero at the center of a blood vessel, and negative on the other side of the blood vessel. This characteristic of the derivative values is retained in the color values. Thus, when an image is colored based on the color values, blood vessels appear as ridges having one bright side and one dark side. The bright side appears as if illuminated by a light source, while the dark side appears to be in shadow.

Figure 2:
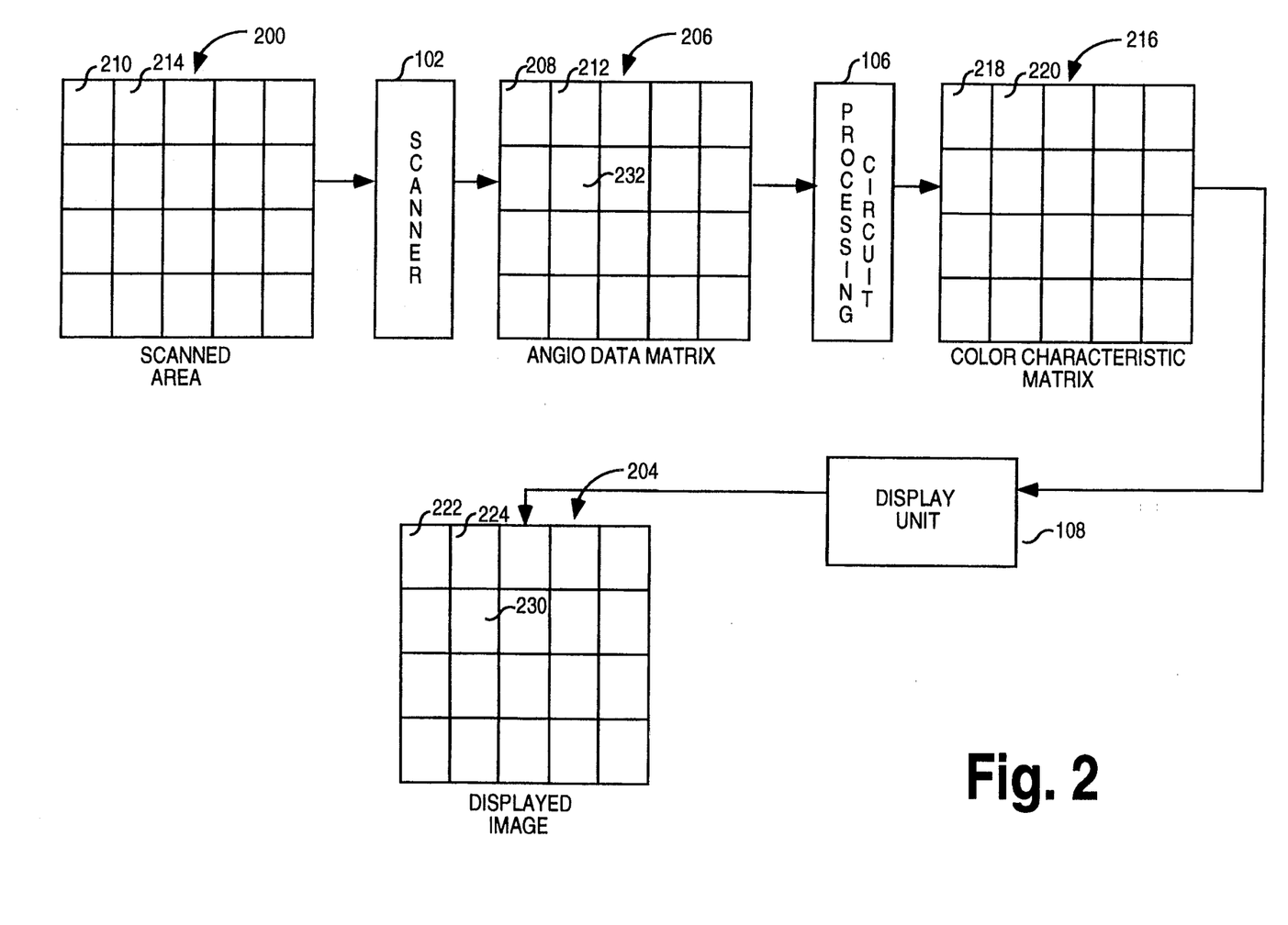
FIG. 2 is a block diagram which illustrates the relationship between a scanned area and a displayed image according to an embodiment of the invention.

Referring now to FIG. 2, it illustrates the relationship between a scanned region of interest 200 and an image 204 representing the scanned area. When scanner 102 scans area 200, the resulting signals produce a matrix of Angio values 206 representing the blood flow within area 200. Each Angio value in the Angio value matrix 206 has an amplitude representing the flow of blood within a specific section of area 200. For example, the amplitude of an Angio value 208 corresponds to the flow of blood within a first section 210, and the amplitude of an Angio value 212 represents the flow of blood within a second section 214. The size of each section depends on the resolution of scanner 102.

The processing circuit 106 processes the values contained in Angio value matrix 206 to generate a color characteristic matrix 216. Each color value in the color characteristic matrix corresponds to a section of area 200. For example, a color value 218 may correspond to section 210, and a color value 220 may correspond to section 214. As explained above, the color values are based in part on the spatial derivative of the Angio values.

Display unit 108 generates image 204 based on the values contained in color characteristic matrix 216. Specifically, the image 204 generated by display unit 108 has a plurality of image subregions. Depending on the resolution of the image 204 and the resolution of scanner 102, each image subregion may correspond, for example, to one or more pixels on a video display device. Each image subregion has a corresponding color value in color characteristic matrix 216. Display unit 108 renders each image subregion with the color characteristic represented by its corresponding color value.

Each image subregion of image 204 represents a section of area 200. For example, color value 218 may correspond to a first image subregion 222, and color value 220 may correspond to a second image subregion 224. Since color value 218 corresponds to section 210, image subregion 222 represents section 210. Likewise, since color value 220 corresponds to section 214, image subregion 224 represents section 214.

Referring again to FIG. 1, processing circuit 106 shall now be described in greater detail. The processing circuit 106 includes an input circuit 110, a selecting circuit 112, a derivative circuit 114, a composite value generation circuit 116 and a mapping circuit 118. The input circuit 110 is operatively coupled to the scanner 102 and receives the plurality of Angio values. Input circuit 110 is a mechanism for storing the information from scanner 102. For example, input circuit 110 may be random access memory.

To determine the color value for a given image subregion, the selecting circuit 112 selects certain Angio values from the Angio value matrix 206. For example, to determine the color value 220 for the image subregion 224, selecting circuit 112 may select Angio data value 208 and Angio data value 212. The selected Angio values represent the flow of the blood in the scanned sections corresponding to the Angio values. For example, Angio value 208 represents blood flow in section 210 and Angio value 212 represents blood flow in section 214.

Preferably, the Angio values selected by selecting circuit 112 to determine a color value for a given image subregion include the Angio value of the scanned section which corresponds to the given image subregion (the "corresponding section"). The Angio value representing the flow of blood in the corresponding section is referred to herein as the corresponding Anglo value. The scanned section corresponding to image subregion 224 is section 214. Therefore, the Angio value 212 which represents section 214 is selected by selecting circuit 112. In addition, selecting circuit 112 also selects the Angio values of one or more scanned sections adjacent to the corresponding section. For example, selecting circuit 112 may select the Angio value 208 which represents section 210, which is adjacent to section 214.

The derivative circuit 114 is coupled to the selecting circuit 112. The derivative circuit 114 receives the selected Angio values from the selecting circuit 112 and generates a spatial derivative value based on the selected Angio values. In the present example, the selected Angio values are Angio values 208 and 212. Therefore, the spatial derivative of these values will simply be the difference between Angio value 208 and Angio value 212.

The composite value generation circuit 116 is operatively coupled to the derivative circuit 114. The composite value generation circuit 116 receives spatial derivative values from the derivative circuit 114, and the corresponding Angio value from the selecting circuit 112 from each region and generates a composite value within the range of composite values based on these inputs, a constant bias value, and two coefficients.

Preferably, the composite value generation circuit 116 includes two multiplier units 122 and 123. The multiplier unit 122 multiplies the corresponding Angio value by a first coefficient to generate a first product. The multiplier unit 123 multiplies the spatial derivative value by a second coefficient to generate a second product. As described above, the first coefficient may be 0.5 and the second coefficient may be 3.0.

The composite value generation circuit 116 further includes an adding unit 120 for summing the first product, the second product and a predetermined constant. As explained above, the predetermined constant is a bias value used to minimize the likelihood that the resulting color value will be negative.

The first and second coefficients and the bias value may be initially stored on storage device 105. Storage device 105 may be any device for storing information. For example, storage device may be a magnetic storage device, an optical storage device, random access memory or read only memory. Processing circuit 106 retrieves the coefficient and bias values from storage device 105 prior to performing the calculations described above.

The mapping circuit 118 is operatively coupled to the composite value generation circuit 116 and the display unit. The mapping circuit 118 receives each composite value from the composite value generation circuit 116. The mapping circuit 118 maps each composite value to a color value responsive to a predetermined correlation. For example, the color characteristic may be brightness. The predetermined correlation may therefore be a mapping of the composite values to shades of gray, such that the higher the composite value, the lighter the corresponding shade of gray.

An image based on color values generated as described above depicts each vessel as a three dimensional ridge illuminated by a light source. The three dimensional appearance is due to the fact that each "vessel ridge" has a light side and a dark side. By reversing the direction in which the spatial derivative is taken, the shading of the ridges will be reversed (i.e. the light side will become dark and the dark side will become light). To a viewer, this has the affect of changing the orientation of the hypothetical light source which is illuminating the ridges.

The spatial derivative operation may also be performed on vertically adjacent Angio values to produce an image which appears to be illuminated by a light source at the top of the image or at the bottom of the image. Likewise, the spatial derivative operation may be performed on diagonally adjacent Angio values to produce an image which appears to be illuminated by a light source in a corner of the image.

Preferably, a user may operate user input device 104 to select the desired orientation of the hypothetical light source which illuminates the "vessel ridges" displayed in the image. Based on input from user input device 104, selecting circuit 112 determines the selection criteria for selecting the Angio values to generate derivative values. If the user desires the ridges to be illuminated from the left, the spatial derivative is taken from left to right. To take the spatial derivative from left to right, selecting circuit 112 selects the corresponding Angio value and an Angio value adjacent to and to the left of the corresponding Angio value. For example, to determine the spatial derivative corresponding to image subregion 224, selecting circuit 112 may select Angio value 2 12 (the corresponding Angio value) and Angio value 208 (the Angio value to the left of the corresponding Angio value). Derivative circuit 114 generates a derivative value based on the Angio values by subtracting the left Angio value from the right Angio value.

Similarly, if the user desires the ridges to be illuminated from the upper left, the spatial derivative is taken diagonally from upper left to lower fight. To take the spatial derivative from upper left to lower fight, selecting circuit 112 selects the corresponding Anglo value and an Angio value adjacent to and to the upper left of the corresponding Angio value. For example, to determine the spatial derivative corresponding to an image subregion 230, selecting circuit 112 may select an Angio value 232 (the corresponding Angio value) and Angio value 208 (the Angio value to the upper left of the corresponding Angio value). Derivative circuit 114 generates a derivative value based on the Angio values by subtracting the upper left Angio value from the lower right Angio value.

Figure 4:
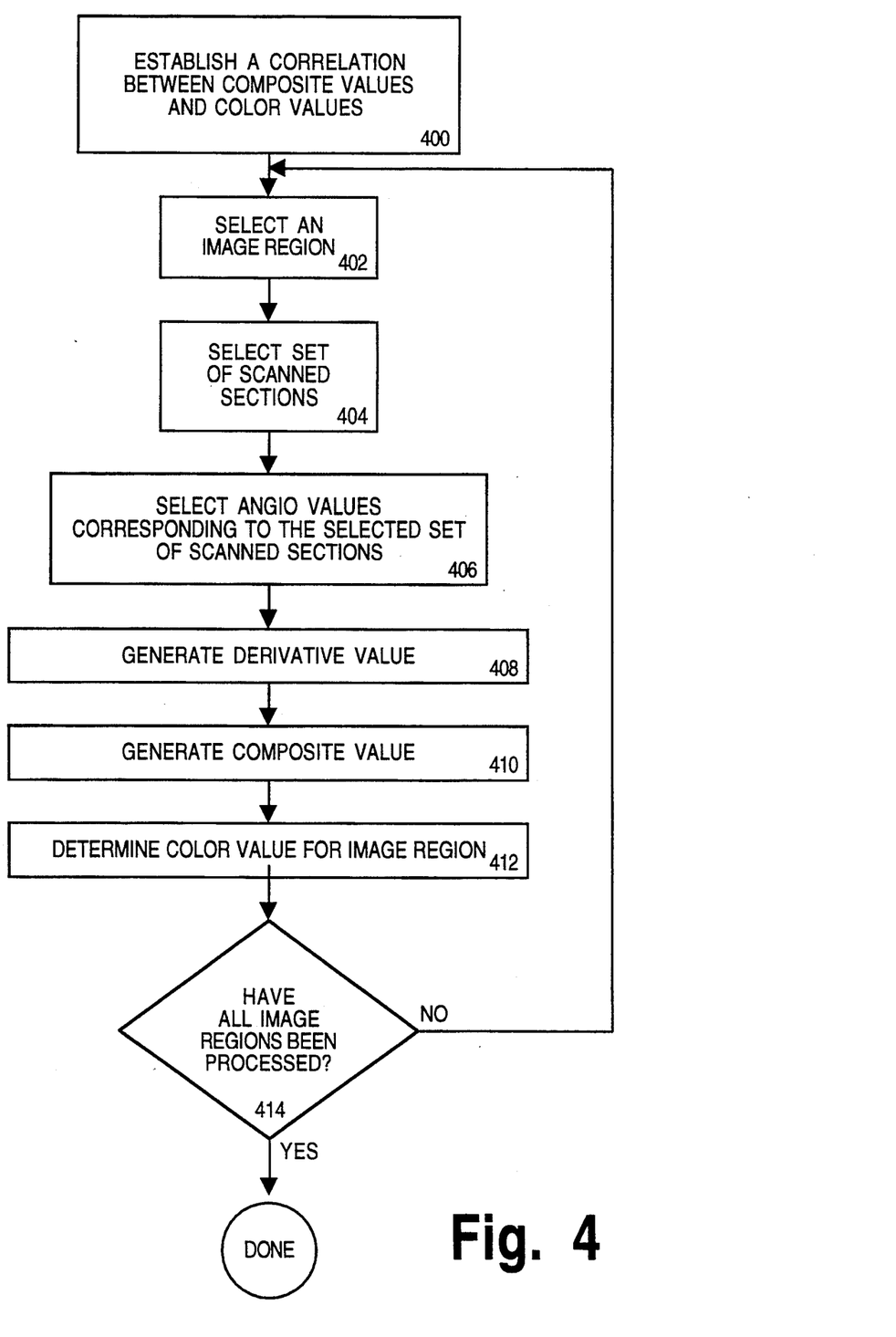
FIG. 4 is a flow chart of a method for generating color values for a scanned image according to an embodiment of the present invention.

Referring now to FIG. 4, it illustrates the steps for determining color characteristics for the plurality of image subregions in image 204. At step 400, a correlation is established between a range of composite values and a plurality of color values. This may be performed, for example, by mapping the range of composite values to gray scale brightness. The higher the composite value, the lighter the corresponding shade of gray. Conversely, the lower the composite value, the darker the corresponding shade of gray.

Steps 402 to 412 are performed for each image subregion in the image 204. At step 402 an image subregion for which a color value has not yet been determined is selected. For the purposes of this example, it shall be assumed that image subregion 224 is initially selected.

At step 404, a set of scanned sections, including the scanned section corresponding to the selected image subregion, is selected. Preferably the set of scanned section includes one or more scanned sections adjacent to the corresponding scanned sections. In the present example, the selected image subregion is image subregion 224. The scanned section corresponding to image subregion 224 is scanned section 214. Therefore, scanned section 214 and scanned section 210, which is adjacent to section 214, are selected.

At step 406, the Angio values corresponding to the selected scanned sections are selected. In the present example, the selected scanned sections include scanned sections 210 and 214. Angio value 208 corresponds to scanned section 210, and Angio value 212 corresponds to scanned section 214. Therefore, Angio values 208 and 212 are selected.

At step 408, a derivative value is generated based on the selected Angio values. The derivative value is a spatial derivative of the selected Angio values. In the present example, the derivative value is simply the difference between Angio values 208 and 212.

At step 410, a composite value is generated based on the derivative value, the corresponding Anglo value, and a predetermined constant. More specifically, a composite value may be generated by multiplying the corresponding Angio value by a first coefficient to generate a first product, multiplying the derivative value by a second coefficient to generate a second product, and adding the first product and the second product to a predetermined constant.

At step 412, a color value for the selected image subregion is determined based on the composite value according to the established correlation. In the present example, a shade of gray would be determined for image subregion 224 based on the composite value generated at step 410 according to the correlation established in step 400.

At step 414, it is determined whether all of the image subregions of the image 204 have been processed. If all of the image subregions have been processed, a color value has been determined for each region of the image 204, and the image 204 may be displayed. If all of the image subregions have not been processed, control passes back to step 402 and an unprocessed image subregion is selected. This process continues until a color value has been determined for each region of the image 204.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. An apparatus for generating an image representing a flow of a substance in a scanned area, the image having a plurality of image subregions, the scanned area having a plurality of scanned sections, the apparatus comprising:

a scanner for scanning said scanned area to produce a plurality of scanned values, said plurality of scanned values including a scanned value for each scanned section of said plurality of scanned sections, said scanned value for each scanned section having an amplitude representing said flow of said substance in said scanned section;

a processing circuit operatively coupled to said scanner, said processing circuit receiving said plurality of scanned values from said scanner, said processing circuit generating a plurality of spatial derivative values based on said plurality of scanned values, said processing circuit determining a color value for each image subregion of said plurality of image subregions, said color value varying in proportion to a corresponding composite value, wherein one component of said corresponding composite value is a spatial derivative value of said plurality of spatial derivative values; and a display unit operatively coupled to said processing circuit, said display unit receiving said color value for each image subregion from said processing circuit, said display unit displaying each image subregion responsive to said color value.

2. The apparatus of claim 1 wherein said processing circuit includes:

an input circuit operatively coupled to said scanner for receiving said plurality of scanned values, a selecting circuit coupled to said input circuit for selecting a selected set of values of said plurality of scanned values for each given image subregion of said plurality of image subregions, said selected set of values representing said flow of said substance in a selected set of scanned sections, said selected set of scanned sections including a scanned section corresponding to said given image subregion, said selected set of values including a first value representing said flow of said substance in said corresponding scanned section, a derivative circuit coupled to said selecting circuit, said derivative circuit receiving said selected set of values from said selecting circuit, said derivative circuit generating a second value responsive to said selected set of values, said second value being a spatial derivative of said selected set of values, a composite value generation circuit operatively coupled to said derivative circuit, said composite value generation circuit receiving said second value from said derivative circuit and generating a composite value within a range of composite values based on said second value, and a mapping circuit operatively coupled to said composite value generation circuit and said display unit, said mapping circuit receiving each composite value from said composite value generation circuit, said mapping circuit mapping said each composite value to a color value responsive to a predetermined correlation.

3. The apparatus of claim 2 wherein said composite value generation circuit includes an adding unit for adding a fraction of said first value to said second value.

4. The apparatus of claim 2 wherein said composite value generation circuit includes a multiplier unit and an adding unit, said multiplier unit multiplying said first value by a first coefficient to generate a first product, said multiplier unit multiplying said second value by a second coefficient to generate a second product, said adding unit adding said first product and said second product to a predetermined constant to generate said composite value.

5. The apparatus of claim 2 wherein said color values represent brightness, said predetermined correlation being a mapping of said range of composite values to gray scale brightness.

6. The apparatus of claim 1 wherein said scanned area is a region of tissue and said substance is blood.

7. The apparatus of claim 2 wherein said selected set of scanned sections includes one or more scanned sections adjacent to said corresponding scanned section.

8. The apparatus of claim 1 further including an input device operatively coupled to said processing circuit, said input device allowing a user to select a desired direction of derivation.

9. The apparatus of claim 1 wherein said processing circuit is a digital processor.

10. The apparatus of claim 1 wherein said processing circuit is an analog circuit.

11. The apparatus of claim 1 wherein said scanner is an ultrasound Angio scanner, said plurality of scanned values being ultrasound Angio data.

12. A method for determining color characteristics for a plurality of image subregions in an image, the image being an image of a scanned area having a plurality of scanned sections, the method comprising the steps of:

establishing a correlation between a range of composite values and a plurality of color values;

receiving a plurality of values having amplitudes representing a flow of a substance in said plurality of scanned sections; and for each image subregion of said plurality of image subregions selecting a selected plurality of values of said plurality of values, said selected plurality of values including a first value corresponding to a first scanned section, generating a second value, said second value being a spatial derivative of said selected plurality of values, multiplying said second value by a predetermined coefficient to produce a first intermediate value, generating a composite value within said range of composite values combining said first intermediate value with a second intermediate value, selecting a color value for said each region based on said composite value according to said correlation, and displaying said each region according to said color value.

13. The method of claim 12 wherein said step of generating said composite value further includes generating said second intermediate value by adding a fraction of said first value to a predetermined constant.

14. The method of claim 12 wherein said step of generating said composite value includes the steps of:

multiplying said first value by a first coefficient to generate a first product;

multiplying said second value by a second coefficient to generate a second product; and adding said first product and said second product to a predetermined constant.

15. The method of claim 12 wherein said color values represent degrees of brightness, said step of establishing a correlation including the step of mapping said range of composite values to gray scale values.

16. The method of claim 12 wherein said scanned area is a region of tissue and said substance is blood.

17. The method of claim 12 wherein said step of selecting said selected plurality of values includes selecting said first value and one or more values of said plurality of values which correspond to one or more scanned sections adjacent to said first scanned section.

18. A method for determining color characteristics for a plurality of image subregions in an image, the image being an image of a scanned area having a plurality of scanned sections, the method comprising the steps of:

establishing a correlation between a range of composite values and a plurality of color values;

receiving a plurality of values having amplitudes representing a flow of a substance in said plurality of scanned sections;

allowing a user to select a desired direction of derivation; and for each image subregion of said plurality of image subregions selecting a selected plurality of values of said plurality of values, said selected plurality of values including a first value corresponding to a first scanned section and one or more values corresponding to one or more other scanned sections, wherein said one or more other scanned sections are aligned with said first scanned section in said direction of derivation.

generating a second value, said second value being a spatial derivative of said selected plurality of values taken in said direction of derivation, generating a composite value within said range of composite values based on said second value, selecting a color value for said each region based on said composite value according to said correlation, and displaying said each region according to said color value.

* * * * *